July 12, 1960  E. A. JONSON  2,944,568
VALVE PARTICULARLY FOR USE IN AN ELECTRO-METALLIZING PISTOL
Filed Nov. 28, 1955
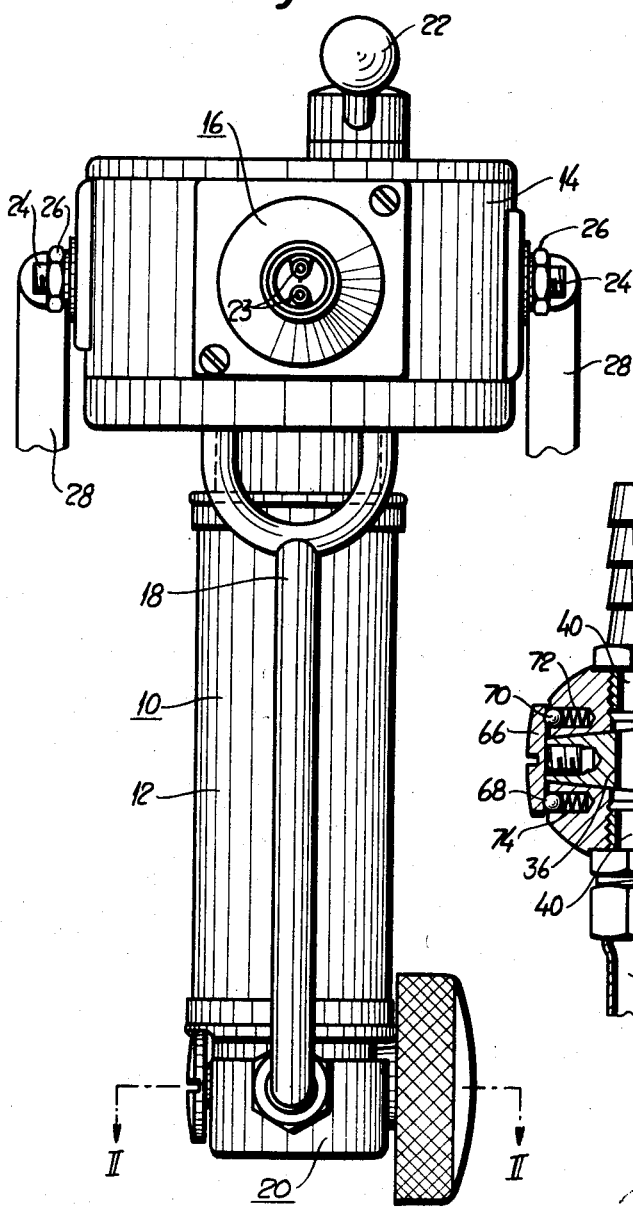
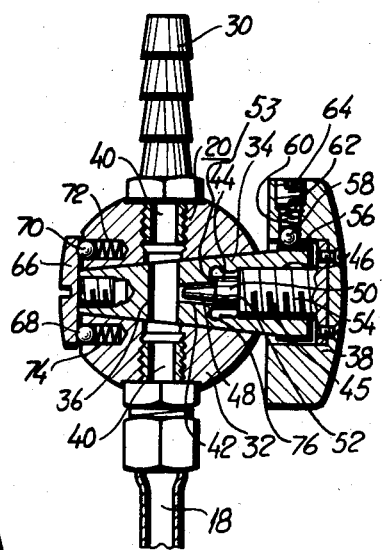

United States Patent Office 2,944,568
Patented July 12, 1960

2,944,568

VALVE PARTICULARLY FOR USE IN AN ELECTRO-METALLIZING PISTOL

Erik Anders Jonson, Stockholm-Vallingby, Sweden, assignor to Bo Löfgren, Ostersund, Sweden Filed Nov. 28, 1955, Ser. No. 549,474

4 Claims. (Cl. 137—630.22)

The invention relates to a valve.

More particularly this invention relates to a valve for an electrometallizing pistol, comprising a valve body adapted to be rotated by means of a handle and provided with a channel communicating in a predetermined angular position of the body with a channel in an external housing.

It is frequently of great importance that a valve is capable of admitting the medium controlled by the same to different stations in a certain sequence. If the valve is used in connection with an electro-metallizing pistol, it will be found to be of considerable importance that the compressed air to the nozzle be admitted prior to movement of the fuse wires toward one another. Otherwise there will be the risk of the arc formed between the wires being displaced rearwardly so as to reach the nozzles comprised in the directing means, thus melting said nozzles, so as to make the pistol inoperable.

One main object of the invention is to provide a valve of the type in question adapted to exclude the possibility of an erroneous sequence in said respects.

A further object of the invention is to provide a valve admitting the compressed air rather slowly to the motor.

Further objects and advantages of the invention will be apparent from the following description considered in connection with the accompanying drawing, which forms a part of this specification, and of which:

Fig. 1 is an elevation of an electro-metallizing pistol, and Fig. 2 is a partial section of a valve belonging thereto taken on line II—II of Fig. 1.

Referring to the drawing, 10 generally denotes an electro-metallizing pistol operating in known manner. The principal parts of said pistol, not shown in detail, are an air motor 12, a mechanism for feeding fuse wires and enclosed within a casing 14, a device generally denoted by 16 for directing the wires relative one another, a conduit 18 for compressed air leading to said directing device, and a valve, generally denoted by 20 and adapted to distribute the compressed air. A lever 22 is adapted to control the pressure exerted by two pressure rollers comprised in the feeding mechanism on the fuse wires located in grooved feeding wheels. Bolts 24 with nuts 26 form the connecting terminals for cables 28 leading to a source of electric current. The valve 20 is adapted to distribute the compressed air supplied to the pistol through a nozzle 30, between the motor 12 and the conduit 18 leading to the directing device 16. In the embodiment illustrated, said valve is substantially constituted by a particularly shaped plug-cock having a stationary part or housing 32 and a movable, conically shaped valve body or plug 34. The through-passage 36 of the plug may in known manner be brought into and out of communication with passages 40 provided in the stationary member by means of a handle or hand-wheel 38, which in the present embodiment is to be understood as admitting or throttling the supply of compressed air to the conduit 18. For the supply of compressed air to the motor 12 the plug 34 is provided with an axial bore extending from the channel 36 and widening conically with a portion 42 toward the hand-wheel 38. This portion 42 then merges into an enlarged cylindrical portion 44, which in turn merges into a portion 46 provided with internal threads. Located in this bore, which widens by steps, is a spindle, generally denoted by 45 and carrying at its one end the hand-wheel 38 while further being shaped so as to engage the conical portion 42 of the bore by means of a conical end stud 48, while merging from said stud into a portion 50, which at the transition portion presents a surface 52 abutting with a sealing fit against the transition surface or seat 53 between the portions 42 and 44 of the bore. The spindle 45 is axially displaceable in the bore by means of a threaded portion 54 engaging the threaded portion 46 of the bore. Inserted between the hand-wheel and the valve body are balls 58, movable in bore 60 and in the present case being provided in a portion of the hand-wheel extending for a distance inwardly over the outer end of the valve body 34, said bores extending at right angles to the axis of said body. The balls are actuated by spring 62 arranged in the bores, the pressure of said springs being controllable by means of screws 64 threaded into the bores. Bosses 56 are formed in said outer end of the valve body 34 on the outside thereof, said bosses forming depressions between them, into which the balls 58 are adapted to snap when the hand-wheel is turned so as to indicate the various angular positions of the hand-wheel. The end of the valve body 34 opposed to that of the hand-wheel has provided therein a similar snapping device, the balls 70 of which are located in bores 72 provided in the stationary part 32 of the valve, wherein said balls are actuated by springs 74. The balls snap into recesses 68 formed in the screw head of a screw 66 arranged on the valve body 34. Supply passages for compressed air to the motor 12 are denoted by 76.

In the position of the valve body or plug 34 shown in Fig. 2, the compressed air has a free passage to the conduit 18 and thus to the wire-directing device 16 of the pistol. If the hand-wheel is now turned in a counter-clockwise direction, the spindle 45 will be screwed in an outwardly direction by the threaded portion so as to cause the tightening surface 52 to raise from its seat 53. The compressed air is thus permitted to flow past the conical portion 48 and through the passages 76 to the motor 12. To reduce the risk of sticking of the threads of the portion 54, the pitch of the thread is rather great, due to which feature the tightening surface rapidly leaves a large free passage for the compressed air even when the hand-wheel is turned only slightly. However, it is preferred that the air supply to the motor commences rather slowly. For this reason the conically shaped portion 48 widens the air passage to the channel 42 slowly even when displaced over a rather long distance from the spindle 45. By the snapping of the balls 58 into the grooves between the bosses 56 the pistol operation can readily make sure of the position of the valve, while any undesired change in the adjustment of the valve due to vibrations emanating from the motor is effectively avoided at the same time. In the position of the valve above described, the pistol operates, and when the work is to be interrupted, the hand-wheel 38 is screwed in a clockwise direction until the tightening surface 52 is caused to bear on its seat, whereby the motor is stopped. If the turning of the hand-wheel is continued from this position in a clockwise direction, the valve body 34 will be entrained, the passage 36 being then brought out of connection with the passages 40 in a manner known per se.

In this case, also, the determination of the position of the valve body is facilitated by the snapping device comprising balls 70 and recesses 68. It is to be noted that with the shoulder 52 on the spindle 45 engaging the seat 53 on the valve body 34 rotation of the hand wheel 38 in a clockwise direction will result in rotating the valve body 34 in the same direction. Rotation of the hand wheel 38 in a counter-clockwise direction will result in disengaging the shoulder 52 from the seat 53 without rotation of the valve body 34. Thus rotation of both the valve body 34 and spindle 45 may be obtained by rotating the hand wheel 38 in a clockwise direction and rotation of the spindle 45 only, may be obtained by rotating the hand wheel 38 in the opposite direction.

While one more or less specific embodiment of the invention has been shown, it is to be understood that this is for purpose of illustration only, and the invention is not to be limited thereby, but its scope is to be determined by the appended claims.

What I claim is:

1. A dual control valve comprising a housing, a passage extending through said housing, a tapered bore extending through said housing transversely of said passage, a tapered valve body rotatably mounted in said bore, a transverse aperture in said body in the plane of said passage whereby said aperture may register with said passage to permit flow therethrough or be moved out of registry to interrupt flow, means for exerting axial force on said body tending to move said body into said bore whereby to maintain the tapered surfaces of said bore and said body in frictional contact tending to resist turning movement of said body within said bore, said means including spring-pressed detents for releasably holding said body in adjusted rotary position within said housing and for providing an indication of such position, an axial bore in one end of said body communicating with said aperture, a shoulder in said axial bore providing a seat, a spindle in said axial bore, a shoulder on said spindle for engaging said seat to control flow from said aperture through a portion of said axial bore, a threaded connection between said spindle and said axial bore for advancing or retracting said spindle relative to said body upon relative rotation between the parts to engage or disengage said shoulder and said seat, said threaded connection being constructed to permit rotation of said spindle relative to said body when said shoulder and said seat are disengaged, due to the frictional resistance of said contact between the tapered surfaces of said body and said housing, to advance said spindle in said body when the spindle is turned in one direction until said shoulder engages said seat and thereafter to turn said body with said spindle upon further turning movement of the spindle in the same direction, and the frictional resistance of said tapered surfaces permitting movement of said spindle relative to said body to disengage said shoulder from seat upon turning movement of said spindle in the opposite direction.

2. A duel control valve comprising a housing, a passage extending through said housing, a tapered bore extending through said housing transversely of said passage, a tapered valve body rotatably mounted in said bore, a transverse aperture in said body in the plane of said passage whereby said aperture may register with said passage to permit flow therethrough or be moved out of registry to interrupt flow, spring-pressed detent means for releasably holding said body in adjusted position and for providing an indication of such position, said spring-pressed detent means exerting axial pressure on said body producing frictional resistance resisting turning movement of said body in said bore, an axial bore in one end of said body communicating with said aperture, a shoulder in said axial bore providing a seat, a spindle in said axial bore, a shoulder on said spindle for engaging said seat to control flow from said aperture through a portion of said axial bore, a threaded connection between said spindle and said axial bore for advancing or retracting said spindle relative to said body upon relative rotation between the parts to engage or disengage said shoulder and said seat, said threaded connection being constructed to permit rotation of said spindle relative to said body when said shoulder and said seat are disengaged, due to the frictional resistance of said contact between the tapered surfaces of said body and said housing, to advance said spindle in said body when the spindle is turned in one direction until said shoulder engages said seat and thereafter to turn said body with said spindle upon further turning movement of the spindle in the same direction, and the frictional resistance of said tapered surfaces permitting movement of said spindle relative to said body to disengage said shoulder from said seat upon turning movement of said spindle in the opposite direction.

3. A dual control valve comprising a housing, a passage extending through said housing, a tapered bore extending through said housing transversely of said passage, a tapered valve body rotatably mounted in said bore, means for exerting axial pressure on said body and tending to produce frictional turning movement between the tapered surfaces of said bore and said valve body, a transverse aperture in said body in the plane of said passage whereby said aperture may register with said passage to permit flow therethrough or may be moved out of registry to interrupt flow, means for exerting axial force on said body tending to move said body into said bore whereby to maintain the tapered surfaces of said bore and said body in frictional contact tending to resist turning movement of said body within said bore, an axial bore in one end of said body communicating with said aperture, a shoulder in said axial bore providing a seat, a spindle in said axial bore, a shoulder on said spindle for engaging said seat to control flow from said aperture through a portion of said axial bore, a threaded connection between said spindle and said axial bore for advancing or retracting said spindle relative to said body upon relative rotation between the parts to engage or disengage said shoulder and said seat, said threaded connection being constructed to permit rotation of said spindle relative to said body when said shoulder and said seat or disengaged, due to the frictional resistance of said contact between the tapered surfaces of said body and said housing, to advance said spindle in said body when the spindle is turned in one direction until said shoulder engages said seat and thereafter to turn said body with said spindle upon further turning movement of the spindle in the same direction, and the frictional resistance of said tapered surfaces permitting movement of said spindle relative to said body to disengage said shoulder from said seat upon turning movement of said spindle in the opposite direction.

4. A dual control valve comprising a housing, a passage extending through said housing, a tapered bore extending through said housing transversely of said passage, a valve body rotatably mounted in said bore, a transverse aperture in said body in the plane of said passage whereby said aperture may register with said passage to permit flow therethrough or be moved out of registry to interrupt flow, means for exerting force tending to cause resistance of turning movement of said valve body within said housing, an axial bore in one end of said body communicating with said aperture, a shoulder in said axial bore providing a seat, a spindle in said axial bore, a shoulder on said spindle for engaging said seat to control flow from said aperture through a portion of said axial bore, a threaded connection between said spindle and said axial bore for advancing or retracting said spindle relative to said body upon relative rotation between the parts to engage or disengage said shoulder and said seat, said threaded connection being constructed to permit rotation of said spindle relative to said body when said shoulder and said seat are disengaged, due to the frictional resistance of said contact between the tapered surfaces of said body and said housing, to advance said spindle in said body when the spindle is turned in one direction until said shoulder engages said seat and thereafter to turn said body with said spindle upon further turning movement of the spindle in the same direction, and the frictional resistance of said tapered surfaces permitting movement of said spindle relative to said body to disengage said shoulder from said seat upon turning movement of said spindle in the opposite direction.

References Cited in the file of this patent
UNITED STATES PATENTS

| | | |
|---|---|---|
| 727,205 | Root et al. | May 5, 1903 |
| 803,965 | Bargamin | Nov. 7, 1905 |
| 2,605,938 | Balcar | Aug. 5, 1952 |